(12) United States Patent
Methot

(10) Patent No.: US 11,280,487 B1
(45) Date of Patent: Mar. 22, 2022

(54) VIDEOTELEPHONY LIGHTING SYSTEM

(71) Applicant: Christien Methot, New York, NY (US)

(72) Inventor: Christien Methot, New York, NY (US)

( * ) Notice: Subject to any disclaimer, the term of this patent is extended or adjusted under 35 U.S.C. 154(b) by 0 days.

(21) Appl. No.: 17/248,247

(22) Filed: Jan. 15, 2021

(51) Int. Cl.
| | |
|---|---|
| *F21V 33/00* | (2006.01) |
| *H04N 7/14* | (2006.01) |
| *F21S 4/28* | (2016.01) |
| *F21S 6/00* | (2006.01) |
| *F21Y 115/10* | (2016.01) |
| *F21Y 103/00* | (2016.01) |

(52) U.S. Cl.
CPC ............ *F21V 33/0052* (2013.01); *F21S 4/28* (2016.01); *F21S 6/006* (2013.01); *H04N 7/142* (2013.01); *F21S 6/002* (2013.01); *F21Y 2103/00* (2013.01); *F21Y 2115/10* (2016.08)

(58) Field of Classification Search
CPC ...... F21V 33/0052; F21V 21/34; F21V 21/35; F21V 21/26; F21S 6/006; F21S 4/28; F21S 6/002; H04N 7/142; H04N 5/2256; F21Y 2103/00; F21Y 2115/10; H04M 1/22; G06F 1/1607
See application file for complete search history.

(56) References Cited

U.S. PATENT DOCUMENTS

| | | | | |
|---|---|---|---|---|
| 5,868,487 A | * | 2/1999 | Polley ................. | F21V 33/0052 362/33 |
| D455,855 S | * | 4/2002 | Emerson, Jr. .................. | D26/62 |
| 8,599,097 B2 | * | 12/2013 | Intravatola .............. | F41A 23/14 343/881 |
| 9,494,844 B2 | * | 11/2016 | Fisher ................... | F21V 21/088 |
| 2003/0227770 A1 | * | 12/2003 | Chen .................... | F21V 33/0052 362/85 |
| 2007/0279903 A1 | * | 12/2007 | Negley ..................... | F21K 9/64 362/230 |
| 2010/0246197 A1 | * | 9/2010 | Takahashi .............. | H04N 9/315 362/430 |
| 2015/0135998 A1 | * | 5/2015 | Barsch .................. | G06F 1/1607 108/42 |
| 2018/0347805 A1 | * | 12/2018 | Abou-Fadel ..... | H04N 5/232127 |

FOREIGN PATENT DOCUMENTS

| | | | | |
|---|---|---|---|---|
| CH | 671087 | * | 7/1989 | ............. F21V 21/26 |
| CN | 107883240 | * | 4/2018 | ............. F21V 21/34 |

OTHER PUBLICATIONS

CN 107882340, 2018, Wang—English Translation (Year: 2018).*
CH 671087, 1989, Waldmann, English Translation (Year: 1989).*

* cited by examiner

*Primary Examiner* — Peggy A Neils
(74) *Attorney, Agent, or Firm* — Dunlap Bennett & Ludwig, PLLC

(57) ABSTRACT

A videotelephony lighting system and a method of using the same is provided. The videotelephony lighting system includes one or more light bars that can prop themselves up or be supported by a stand so as to be positioned in different configurations to light a user's face while they are on a video call. The videotelephony lighting system embodies a simple approach wherein each lightbar provides only one linear high-CRI LED light source having a 2700-3000 K CCR.

10 Claims, 3 Drawing Sheets

VIDEOTELEPHONY LIGHTING SYSTEM

BACKGROUND OF THE INVENTION

The present invention relates to lighting systems and, more particularly, a videotelephony lighting system embodied in a kit enabling a portable, powerful, and professional lighting for video calls.

Video calls are becoming more ubiquitous by the day. Because of the COVID pandemic as well as the ever-increasing reach of the Internet and global economy, many of these video calls have been imposed on their participants, even if the participant has no familiarity with video production, particularly adequate lighting for video productions. As a result, most video calls lack professional presentation even though these video calls are common for many potentially life-changing conversations, such as job interviews, multi-million-dollar negotiations, and so on. Most participants, however, have bad lighting when they are being viewed while on such live video calls. Bad lighting makes people look bad.

Currently available solutions or video call lighting systems are too complicated and use battery-powered lighting that can change color temperature. These current systems have the following drawing backs: The battery may not be ready when one needs it, and users end of carrying around the weight of a battery making it less portable. Furthermore, choosing a color temperature is really only needed when using a professional camera; thus, these current systems add unnecessary complexity to the system, inviting frustration to the legion of non-professional users of video calls.

As can be seen, there is a need for a videotelephony lighting system embodied in a kit enabling a portable, powerful, and professional lighting for video calls.

The present invention may embody a high-CRI (Color Rendering Index) systemic light source. The high-CRI may be a flattering 2700-3000 K (CCR) (Correlated Color Temperature) that provides a warm-color temperature light, that looks great on everyone's skin. By coupling the systemic light source with a small platform, the system is kit-enabled for ultimately enhancing the solution's portability and ease of use.

SUMMARY OF THE INVENTION

In one aspect of the present invention, a videotelephony lighting system includes the following: one or more lightbars, each lightbar providing only one light source, wherein the light source is a linear high-CRI LED having a 2700-3000 K CCR; a track along a rear surface of each lightbar; a mounting block operatively associated with the track so that the mounting block is movable therealong; and one or more kickstands along said rear surface; and a dimmer switch electrically coupled to the light source.

In another aspect of the present invention, a kit for providing a videotelephony lighting system, the kit includes the following: one or more lightbars, each lightbar providing only one light source, wherein the light source is a linear high-CRI LED having a 2700-3000 K CCR; a multi-port power source; a stand for each lightbar; and a kit container for retrievably storing said one or more lightbars, the multi-port power source and each stand.

In yet another aspect of the present invention, a method of lighting a videotelephonic session comprising a display screen by using the videotelephony lighting system of claim 1, the method including, in one embodiment: placing a first lightbar between the display screen and a user of the display screen, each lightbar providing only one light source, wherein the light source is a linear high-CRI LED having a 2700-3000 K CCR; in a second embodiment, placing a second lightbar and a third lightbar on each side of the display screen, respectively, wherein the second and third lightbars are in a vertical orientation relative to the display screen; and utilizing a stand to support each of second and third lightbars in the vertical orientation, wherein the stand operatively associates with the mounting block each lightbar; or in another embodiment, just placing a first lightbar above the display screen in a horizontal orientation by way of the one or more kickstands; or in another embodiment, placing a first lightbar and a second lightbar on each side of the display screen, respectively, wherein the first and second lightbars are in a vertical orientation relative to the display screen; through utilizing a stand to support each of second and third lightbars in the vertical orientation, wherein the stand operatively associates with the mounting block each lightbar.

These and other features, aspects and advantages of the present invention will become better understood with reference to the following drawings, description and claims.

DETAILED DESCRIPTION OF THE INVENTION

Figure 1:
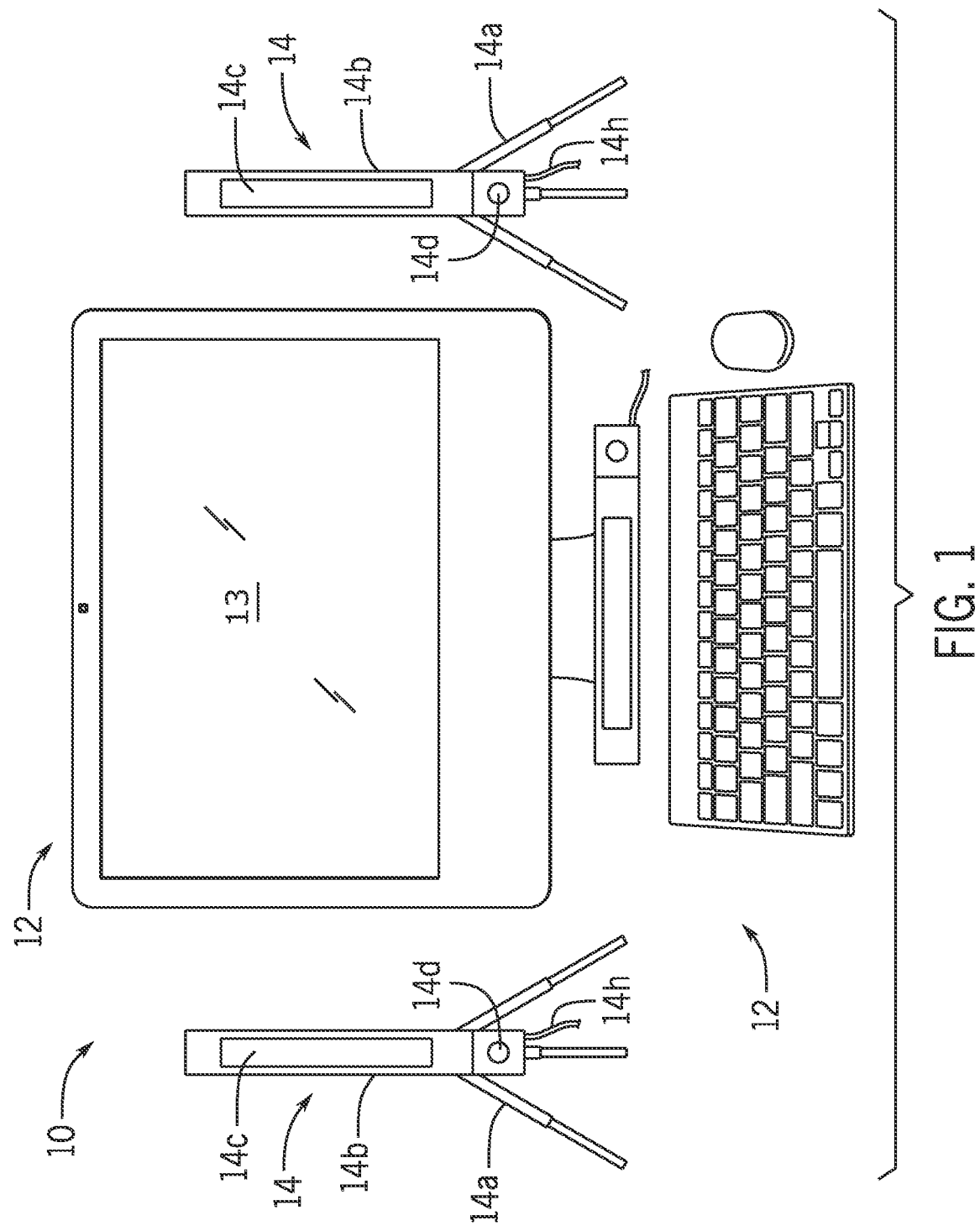
FIG. 1 is a front elevation view of an exemplary embodiment of the present invention.
Figure 2:
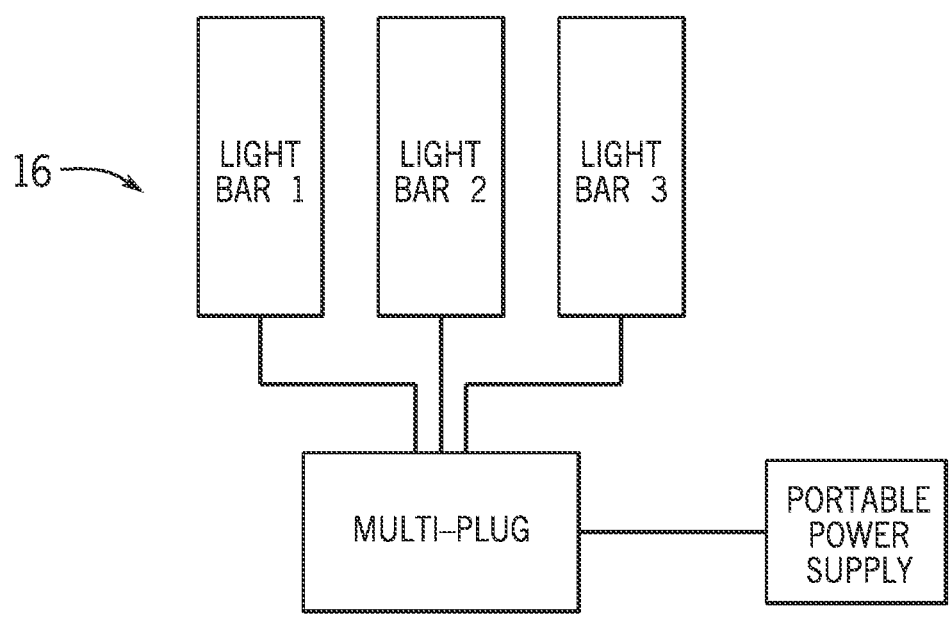
FIG. 2 is a schematic view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a videotelephony lighting system and a method of using the same. The videotelephony lighting system includes one or more light bars that can prop themselves up or be supported by a stand so as to be positioned in different configurations to light a user's face while they are on a video call. The videotelephony lighting system embodies a simple approach wherein each lightbar provides only one linear high-CRI LED light source having a 2700-3000 K CCR.

Referring now to FIGS. 1 through 4, the present invention may include a videotelephony lighting system 10 and a method of using the same. The videotelephony lighting system 10 may be used in conjunction with a computer 12 providing videotelephonic functionality, such as video calls.

The videotelephony lighting system 10 may include one or more systemic lights 14 or lightbars. The systemic light 14 may operatively associate with a stand 14a dimensioned and adapted to selectively position the light emitted from the systemic light 14; the stand 14a may be a tripod, a directable platform. The systemic light 14 has a light emitting source 14c, which may be a linear LED light source, such as a 3000 K, high CRI. The light emitting source 14c may be housed in a housing 14b providing, in certain embodiments, an inline dimmer 14d adapted to adjust the brightness of the systemic light 14 to best suit the situation.

The housing 14b may have a first surface 31 providing the light emitting source 14c and the inline dimmer 14d. The housing 14b may have a second surface 32, opposite the first surface 31. The second surface 32 may provide a longitudinal track 14f having a mounting block 26 that operatively associates with the track 14f so as to selectively slide there along. The mounting block 26 may provide a mounting point 14e, which in certain embodiments may be threaded for receiving a threaded fastener. The mounting point 14e may be connectable to a connection point on the stand 14a, so that the housing 14b and the stand 14a can work together as illustrated in FIG. 1. The second surface 32 may also provide one or more kickstands 14g so that the housing 14b may be propped up along a supporting surface.

Figure 4:
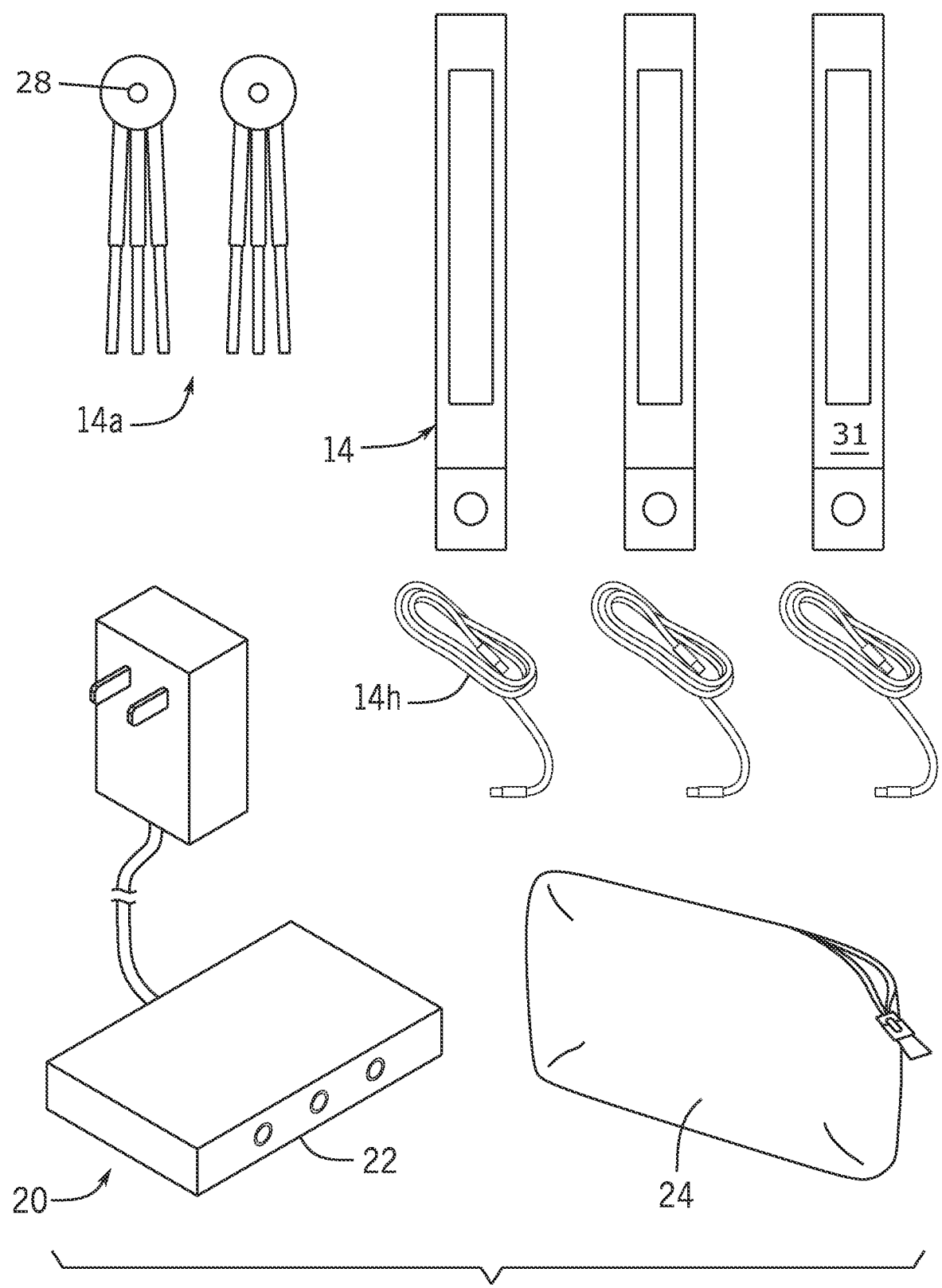
FIG. 4 is an exploded perspective view of an exemplary embodiment of the present invention.

Referring to FIG. 4. the present invention can be embodied in a systemic kit 18 that includes one or more stand 14a, one or more systemic light 14, one or more power cords 14h, a portable, power source 20 with a plurality of ports 22 and a kit container 24, such as a zippered pouch, for containing all of the above.

Figure 3:
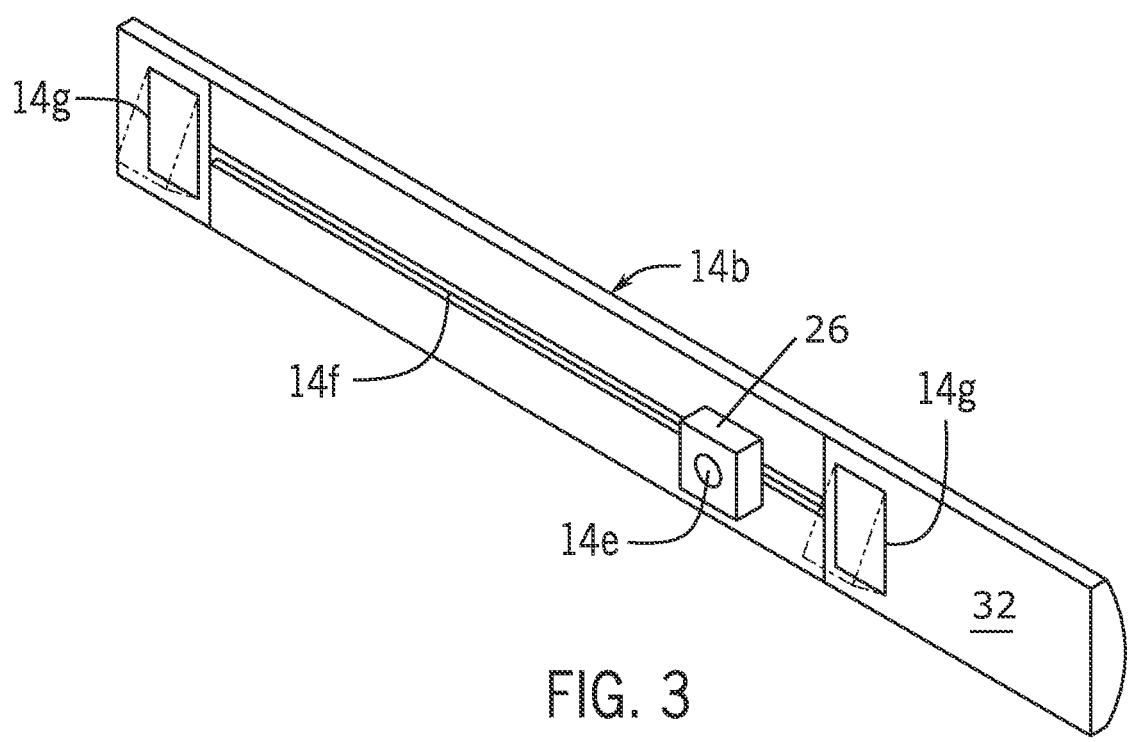
FIG. 3 is a perspective view of an exemplary embodiment of the present invention.

Referring to FIG. 3, the present invention can be configured so that a plurality the systemic lights 14 can be selectively activated through the plurality of ports 22.

The systemic light 14 can be used by itself by way of the kickstands 14g provided along its second surface 32 and be selectively placed between the keyboard and screen of a computer 12 to illuminate the face of the video caller. The systemic light 14 can also be placed on the stand 14a and positioned horizontally directly above the display screen 13 of the computer 12 to illuminate the video caller. A pair of systemic lights 14 can be mounted on a pair of stands 14a and mounting vertically one to the left and one to the right of the display screen 13 to light the face of the video caller. The portable power source 20 can provide power to three or more systemic lights 14, yet the portable power source 20 is light enough to be retrievably stored with the three or more systemic lights 14 and stands 14a as a kit in the kit container 24 so that a user always knows where to find it and store and tote all the systemic components together. Finally, one systemic light 14 may be positioned horizontally on it kickstand 14g and be placed between the keyboard and screen while two (2) systemic lights 14 are mounted vertically on the tripods 14a: one to the left and one to the right of the computer 12 to light a user's face.

The mounting block 26 allows the systemic light 14 to be mounted on the stand 14a for selective positioning easily and securely without needing to be attached to the computer 12 being used for the online video call.

Additionally, the present invention may be used for remote setups for professional newscasters to be well lit recording video on the road.

It should be understood, of course, that the foregoing relates to exemplary embodiments of the invention and that modifications may be made without departing from the spirit and scope of the invention as set forth in the following claims.

What is claimed is:

1. A videotelephony lighting system comprising:
   one or more lightbars, each lightbar providing only one light source, wherein the light source is a linear high Color Rendering Index (CRI) LED having a 2700-3000 K Correlated Color Temperature (CCR);
   a track along a rear surface of each lightbar;
   a mounting block operatively associated with the track so that the mounting block is movable therealong; and
   one or more kickstands along said rear surface.

2. The system of claim 1, further comprising a dimmer switch electrically coupled to the light source.

3. A method of lighting a videotelephonic session comprising a display screen by using the videotelephony lighting system of claim 1, the method comprising:
   placing a first lightbar between the display screen and a user of the display screen, wherein the light source is a linear high-CRI LED having a 2700-3000 K CCR.

4. The method of claim 3, further comprising placing a second lightbar and a third lightbar on each side of the display screen, respectively, wherein the second and third lightbars are in a vertical orientation relative to the display screen.

5. The method of claim 4, further comprising utilizing a stand to support each of second and third lightbars in the vertical orientation, wherein the stand operatively associates with the mounting block of each lightbar.

6. A method of lighting a videotelephonic session comprising a display screen by using the videotelephony lighting system of claim 1, the method comprising:
   placing a first lightbar above the display screen in a horizontal orientation by way of the one or more kickstands.

7. A method of lighting a videotelephonic session comprising a display screen by using the videotelephony lighting system of claim 1, the method comprising:
   placing a first lightbar and a second lightbar on each side of the display screen, respectively, wherein the first and second lightbars are in a vertical orientation relative to the display screen.

8. The method of claim 7, further comprising utilizing a stand to support each of the first and second lightbars in the vertical orientation, wherein the stand operatively associates with the mounting block of each lightbar.

9. A videotelephony lighting system comprising:
   one or more lightbars, each lightbar consisting of:
      a linear high Color Rendering Index (CRI) LED having a 2700-3000 K Correlated Color Temperature (CCR);
      a track along a rear surface of each lightbar;
      a mounting block operatively associated with the track so that the mounting block is movable therealong; and
      one or more kickstands along said rear surface.

10. A videotelephony lighting system comprising:
    one or more lightbars, each lightbar comprising:
       only one light source, wherein the light source is a linear high Color Rendering Index (CRI) LED having a 2700-3000 K Correlated Color Temperature (CCR);
       a track along a rear surface of each lightbar;
       a mounting block operatively associated with the track so that the mounting block is movable therealong;
       two kickstands along said rear surface, wherein each kickstand is wedge-shaped for propping the lightbar in a horizontal orientation; and
       a dimmer switch electrically coupled to the light source; and
    for each lightbar, a directable platform operatively associable with the mounting block for propping the lightbar in a vertical orientation, the directable platform having three or more legs.

* * * * *